United States Patent
Kawano et al.

(10) Patent No.: US 6,564,052 B1
(45) Date of Patent: May 13, 2003

(54) WIRELESS LOCAL LOOP SYSTEM AND METHOD FOR WIRELESS LINK CONTROL

(75) Inventors: Hisao Kawano, Kawasaki (JP); Naohito Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/521,100

(22) Filed: Mar. 7, 2000

(30) Foreign Application Priority Data

Mar. 19, 1999 (JP) ............................................. 11-076760

(51) Int. Cl.[7] .............................. H04Q 7/20; H04B 3/36; H04B 7/14
(52) U.S. Cl. ............................ 455/424; 455/8; 455/426; 455/438
(58) Field of Search ................................ 455/8, 9, 67.1, 455/424, 426, 561, 436, 438

(56) References Cited

U.S. PATENT DOCUMENTS

| | | | | |
|---|---|---|---|---|
| 4,949,340 A | * | 8/1990 | Smith et al. | 455/9 |
| 5,187,808 A | * | 2/1993 | Thompson | 455/8 |
| 5,551,056 A | * | 8/1996 | Koponen et al. | 455/8 |
| 5,570,343 A | * | 10/1996 | Bishop et al. | 455/8 |

FOREIGN PATENT DOCUMENTS

| | | |
|---|---|---|
| JP | 61-186033 | 8/1986 |
| JP | 10-13944 | 1/1998 |

* cited by examiner

*Primary Examiner*—Quochien Vuong
(74) *Attorney, Agent, or Firm*—Katten Muchin Zavis Rosenman

(57) ABSTRACT

A wireless local loop system including wireless base stations each provided with a detecting part for detecting a fault between it and a wireless base station controller and a part, when detecting a fault by the detecting means, for adding blocking information to broadcast information and sending the same. The wireless local loop system further including wireless subscriber units, for setting up wireless links with the wireless base stations, each provided with a switching part, when receiving and recognizing the blocking information, for switching the setting of the stand-by station to a wireless base station of a nearby area, whereby a new stand-by station is established by a wireless base station which is able to start communication through a wireless link by the blocking information of the occurrence of a fault, which blocking information can be received since the reception level does not fall or the link is not disconnected.

18 Claims, 11 Drawing Sheets

Fig.4

| WIRELESS BASE STATION | WBS-ID | FAULT INFORMATION | NEARBY WBS INFORMATION |
|---|---|---|---|
| WBS1 | 01 | FAULTY | 02 |
| WBS2 | 02 | NON | 03 |
| WBS3 | 03 | NON | 02 |
| ⋮ | ⋮ | ⋮ | ⋮ |

Fig.6

| WIRELESS BASE STATION | WBS-ID | FAULT INFORMATION | NEARBY WBS INFORMATION |
|---|---|---|---|
| WBS1 | 01 | NON | 02 |
| WBS2 | 02 | FAULTY | 01,03 |
| WBS3 | 03 | NON | 02,04 |
| ⋮ | ⋮ | ⋮ | ⋮ |

WIRELESS LOCAL LOOP SYSTEM AND METHOD FOR WIRELESS LINK CONTROL

BACKGROUND OF THE INVENTION

1. Field of the Invention

The present invention relates to a wireless local loop system and method for wireless link control for setting up a wireless link for communication between a wireless subscriber unit of a subscriber and a wireless base station connected to a wireless base station controller.

A wireless local loop (WLL) system connects subscribers scattered over different regions with wireless base stations through wireless links so as to enable communication between subscribers, including ones using ordinary wire telephones, without laying cables between line exchanges and the subscribers. More efficient operation of such a wireless local loop system is desired.

2. Description of the Related Art

As will be explained later in more detail with reference to the drawings, in a WLL system of the related art, the wireless subscriber units detect the normality of the wireless base stations by monitoring the reception levels. When the reception level drops or a link is disconnected, it is possible to switch over to another wireless base station. If a fault occurs at the link side while a wireless base station is still able to send and receive wireless signals, communication with the wireless base station controller side is disabled. Therefore, even if the reception level of the broadcast information or other signal, at the wireless subscriber unit, is normal, communication is disabled while leaving the cause unknown and thus the quality of service is deteriorated. This is the problem.

SUMMARY OF THE INVENTION

An object of the present invention is to provide a wireless local loop system including wireless base stations each can notify the wireless subscriber units of the occurrence of a fault and its recovery to enable switching to another stand-by wireless base station and thereby avoid a deterioration of the quality of service.

To attain the above object, according to the present invention, there is provided a wireless local loop system including wireless base stations each provided with a detecting means for detecting a fault between it and a wireless base station controller and a means, when detecting a fault by the detecting means, for adding blocking information to broadcast information and sending the same. The wireless local loop system further including wireless subscriber units, for setting up wireless links with the wireless base stations, each provided with a switching means, when receiving and recognizing the blocking information, for switching the setting of the stand-by station to a wireless base station of a nearby area, whereby a new stand-by station is established by a wireless base station which is able to start communication through a wireless link by the blocking information of the occurrence of a fault, which blocking information can be received since the reception level does not fall or the link is not disconnected.

Therefore, it is possible to avoid a drop in the quality of service at the time of occurrence of a fault in a WLL system.

BRIEF DESCRIPTION OF THE DRAWINGS

The above object and features of the present invention will be more apparent from the following description of the preferred embodiments given with reference to the accompanying drawings, wherein:

FIG. 4 is an explanatory view of information stored in a database;

FIG. 6 is an explanatory view of information stored in a database;

DESCRIPTION OF THE PREFERRED EMBODIMENTS

Before describing the embodiments of the present invention, the related art and the disadvantages therein will be described with reference to the related figures.

Figure 11:
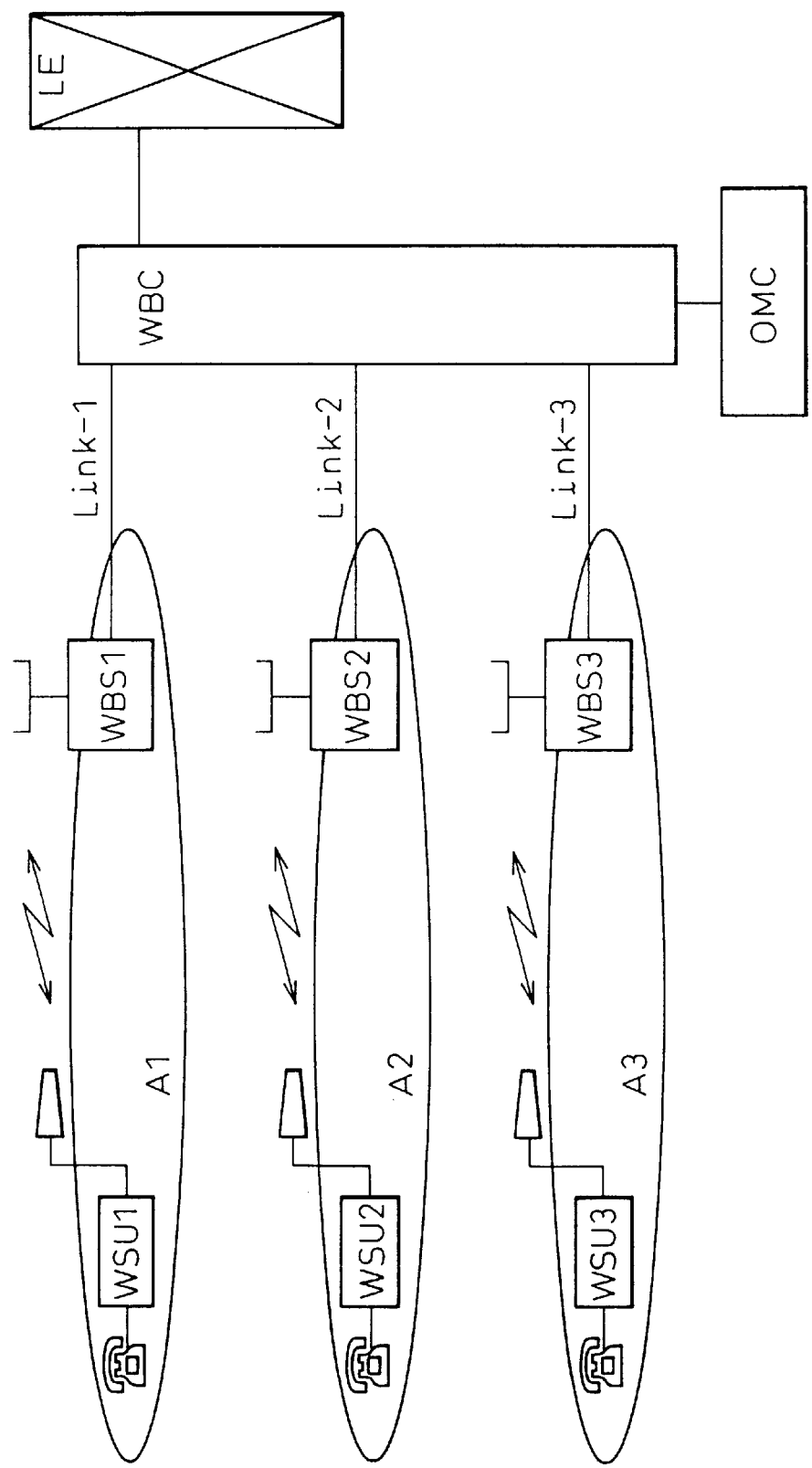
FIG. 11 is an explanatory view of a WLL system.

FIG. 11 is an explanatory view of a WLL system. In the figure, LE indicates a line exchange, WBC a wireless base station controller, OMC an operation maintenance console, WBS1, WBS2, and WBS3 wireless base stations, Link-1, Link-2, and Link-3 links between the wireless base station controller WBC and the wireless base stations, WSU1, WSU2, and WSU3 wireless subscriber units, and A1, A2, and A3 areas covered by the wireless base stations WBS1, WBS2, and WBS3.

For example, the case is shown where one wireless subscriber unit WSU1 is arranged in the area A1 of the wireless base station WBS1, one wireless subscriber unit WSU2 is arranged in the area A2 of the wireless base station WBS2, and one wireless subscriber unit WSU3 is arranged in the area A3 of the wireless base station WBS3. Further, the wireless subscriber units WSU1, WSU2, and WSU3 are provided with antennas having a certain degree of directivity to the wireless base station WBS1, WBS2, and WBS3 side, respectively, but are configured to enable wireless communication with the wireless base stations in the nearby areas as well.

Further, the plurality of wireless base stations WBS1, WBS2, and WBS3 are connected to the wireless base station controller WBC connected to the line exchange LE through the wire or wireless links Link-1, Link-2, and Link-3. In the figure, the case of three wireless base stations connected to the wireless base station controller WBC is shown, but this may be further increased to enable expansion of the area in which wireless subscriber units can be serviced.

Further, the wireless links between the wireless subscriber units WSU1, WSU2, and WSU3 and the wireless base stations WBS1, WBS2, and WBS3 can be formed for example by a common control channel and individual speech channels. The call origination, call termination, etc. in a mobile telephone system etc. are controlled through the common control channel, while conversation is possible by assigning a speech channel. Further, broadcast information on the control channel can be used for notifying wireless base station identification information etc. to the wireless subscriber units.

Summarizing the problem to be solved by the present invention, a WLL system of the related art stands on a basis where the wireless subscriber units do not move, therefore the wireless subscriber units inside the areas A1, A2, and A3 of respective wireless base stations have wireless links which have been set up with the wireless base stations WBS1, WBS2, and WBS3 corresponding to the areas A1, A2, and A3, respectively. Further, the wireless subscriber units WSU1, WSU2, and WSU3 receive broadcast information from the wireless base stations WBS1, WBS2, and WBS3 to identify the wireless base stations WBS1, WBS2, and WBS3 and monitor the normality by the reception level etc. at that time.

For example, if a fault occurs at a wireless base station resulting in a drop in the transmission power or disconnection of transmission, the wireless subscriber unit serviced by that wireless base station detects the drop in the reception level or disconnection of reception, judges that a fault has occurred in the wireless base station, and detects the reception of broadcast information from a wireless base station of a nearby area. In this case, the wireless base station giving a predetermined reception level is recognized by the wireless base station identification information etc. and that wireless base station is switched to a stand-by station. Further, a request, in the case of call origination, for setting a wireless link is sent to the wireless base station set as the above stand-by station. Due to this, the wireless subscriber unit can establish a wireless link with a wireless base station of a nearby area for communication instead of the wireless base station which has become unable to transmit a radio wave.

Even when a wireless base station falling in transmission power or disconnected in transmission due to the occurrence of a fault later becomes able to transmit a radio wave again after recovery from the fault, since the wireless subscriber unit serviced by that wireless base station has already switched its stand-by station to another wireless base station not its inherent wire base station, processing is not performed to switch back to the inherently connected wireless base station, so far as the transmission power of the stand-by wireless base station does not fall or transmission is not disconnected, even after the wireless base station recovers from the fault.

Also, when a wired or wireless link Link-1, Link-2, or Link-3 between the wireless base station controller WBC and a wireless base station WBS1, WBS2, or WBS3 is disconnected or a fault occurs in the interface or other fault, a similar problem will occur, if the transmission of the radio wave to the wireless base station WBS1, WBS2, or WBS3 is disconnected, at the time of restoration therefrom. Although the wireless subscriber unit and the wireless base station are still able to send and receive radio waves with each other and communication remains possible between them, communication with the wireless base station controller WBC is disabled. As a result, communication by the wireless subscriber unit is disabled accordingly. In this situation as well, it is not possible to detect the occurrence of a fault at the wireless base station side.

That is, as explained above, in the WLL system of the related art, the wireless subscriber units WSU1, WSU2, and WSU3 detect the normality of the wireless base stations WBS1, WBS2, and WBS3 by the reception levels and can switch over to other wireless base stations when the reception levels drop or the reception is disconnected. If a fault occurs at the link Link-1, Link-2, or Link-3 side while a wireless base station WBS1, WBS2, or WBS3 is still able to send and receive wireless signals, the wireless subscriber unit WSU1, WSU2, or WSU3 cannot communicate with the wireless base station controller WBC side. Therefore, even if the reception level of the broadcast information or other signal is normal, communication is disabled while leaving the cause unknown, and thus the problem arises in that there is a drop in the quality of service.

The present invention provides a WLL system and a wireless control method, in which the occurrence of a fault and its recovery is notified to the wireless subscriber units to enable switching to another stand-by station and thereby avoid a drop in the quality of service. This will be explained in further detail below.

Note that the present invention includes such systems as first to fifth aspects and such methods as sixth to 10th aspects thereof.

The WLL system according to a first aspect of the present invention comprises a plurality of wireless base stations WBS1, WBS2, and WBS3 connected to a wireless base station controller WBC and a plurality of wireless subscriber units WSU1, WSU2, and WSU3 connected to these wireless base stations through wireless links, wherein the wireless base stations WBS1, WBS2, and WBS3 are provided with means for detecting a fault between them and the wireless base station controller WBC and means for setting blocking information in broadcast information and notifying the fault to the wireless subscriber units WSU1, WSU2, and WSU3 when the detecting means detects a fault and the wireless subscriber units are provided with first switching means for switching the setting of a stand-by station to the wireless base station of a nearby area when receiving the blocking information. Due to this, the wireless subscriber units WSU1, WSU2, and WSU3 can recognize the occurrence of a fault at the higher unit side by receiving and recognizing the blocking information even when the reception level does not fall and, therefore, designate a wireless base station of a nearby area as the stand-by station.

According to a second aspect of the present invention, the wireless base stations WBS1, WBS2, and WBS3 can be provided with a first nearby base station information notifying means for adding blocking information and identification information of the wireless base station of a nearby area to the broadcast information and sending the same to switch the setting of the stand-by station when the detecting means detect the fault. Due to this, the wireless subscriber units can switch the setting of the stand-by stations to other wireless base stations based on the wireless base station identification information notified together with the blocking information.

According to a third aspect of the present invention, the wireless base stations WBS1, WBS2, and WBS3 are provided with second nearby base station information notifying means for adding blocking information and identification information of a plurality of wireless base stations of nearby areas serving as stand-by stations to the broadcast information and sending the same when the detecting means detect the fault and the wireless subscriber units WSU1, WSU2, and WSU3 are provided with second switching means for comparing the reception levels from the plurality of wireless base stations of the nearby areas and switching the setting of the stand-by station to the wireless base station giving the highest reception level. It is therefore possible to select the stand-by station at the wireless subscriber unit side.

According to a fourth aspect of the present invention, each of the wireless base stations WBS1, WBS2, and WBS3 is provided with an unblocking information notifying means for adding unblocking information to the broadcast information and sending the same when the detecting means detects a fault and then detects recovery from the fault and each of the wireless subscriber units WSU1, WSU2, and WSU3 is provided with a third switching means for switching the setting of the stand-by station to the original wireless base station when receiving and recognizing the unblocking information.

According to a fifth aspect of the present invention, each of the wireless base stations WBS1, WBS2, and WBS3 is provided with a counter incremented in accordance with a notification of a change of a nearby wireless base station status sent from the wireless base station controller WBC due to recovery from the fault and a count sending means for adding the count value of the counter to the broadcast information as nearby wireless base station status information and sending the same and each of the wireless subscriber units WSU1, WSU2, and WSU3 is provided with a fourth switching means for detecting a change in the nearby wireless base station status information, recognizing the recovery of the wireless base station from the fault, and switching the setting of the stand-by station to the original wireless base station.

According to a sixth aspect of the present invention, there is provided a method for wireless link control in a WLL system comprising a plurality of wireless base stations WBS1, WBS2, and WBS3 connected to a wireless base station controller WBC and a plurality of wireless subscriber units WSU1, WSU2, and WSU3 connected to these wireless base stations through wireless links, comprising a step of adding blocking information to the broadcast information, when a fault occurring between the wireless base station controller WBC and a wireless base station WBS1, WBS2, or WBS3 is detected, and sending the same, and a step of receiving and recognizing the sent block information at the wireless subscriber unit having the wireless base station as a stand-by station and further switching the setting of the stand-by station to a wireless base station of a nearby area not sending a blocking information.

According to a seventh aspect of the present invention, the method further comprises a step of adding, when a wireless base station WBS1, WBS2, or WBS3 detects a fault, identification information of a wireless base station of a nearby area to be served as a stand-by station for the wireless subscriber unit which has used the wireless base station as a stand-by station before the fault, as well as the blocking information, to the broadcast information and sending the same and a step of switching, at the wireless subscriber unit receiving the sent broadcast information, the setting of the stand-by station to the wireless base station of the nearby area based on the identification information of that wireless base station.

According to an eighth aspect of the present invention, the method further comprises a step of adding, when a wireless base station WBS1, WBS2, or WBS3 detects a fault, an identification information of a plurality of the wireless base stations of nearby areas to the broadcast information, as well as the blocking information and sending the same, a step of measuring, at each of the wireless subscriber unit receiving the sent broadcast information, the reception levels from the plurality of wireless base stations of nearby areas and a step of switching the setting of the stand-by station to the wireless base station giving the maximum reception level.

According to a ninth aspect of the present invention, the method further comprises a step of adding, when a wireless base station WBS1, WBS2, or WBS3 detects a fault, blocking information to broadcast information and sending the same, a step of adding, when detecting recovery from the fault, unblocking information to the broadcast information and sending the same, a step of storing, at each of the wireless subscriber unit, identification information of the wireless base station originally used as the stand-by station, a step of continuing, after receiving and recognizing the blocking information and then changing the wireless base station of the nearby area to a stand-by station, receiving the broadcast information from the wireless base station of the nearby area originally used as the stand-by station at predetermined intervals, and a step of receiving and recognizing the unblocking information and then switching the setting of the stand-by station to the original wireless base station based on the stored identification information of the wireless base station.

According to a 10th aspect of the present invention, the method further comprises a step of sending, from the wireless base station controller WBC, a notification of a change of a nearby base station status to a normal wireless base station other than the wireless base station recovering, after detection of an occurrence of a fault, from the fault, a step of adding, by providing, at each of the wireless base stations WBS1, WBS2, or WBS3, a counter incremented at every notification of a change of a nearby base station, a count value of the counter as nearby base station status information to the broadcast information and sending the same, a step of adding, when detecting the fault, blocking information to the broadcast information and sending the same, a step of adding, when detecting recovery from the fault, unblocking information to the broadcast information and sending the same, a step of storing, at each of the wireless subscriber units WSU1, WSU2 and WSU3, identification information of the wireless base station originally used as the stand-by station, a step of switching, when receiving and recognizing the block information, the setting of the stand-by station to a wireless base station of a nearby area, a step of holding the count value as the nearby base station status information of that wireless base station, a step of comparing and detecting the change in the count value at the time of the recovery from the fault, a step of receiving the broadcast information from the stored original wireless base station, and a step of restoring, when the unblocking information is included, the wireless radio station as a stand-by station.

Figure 1:
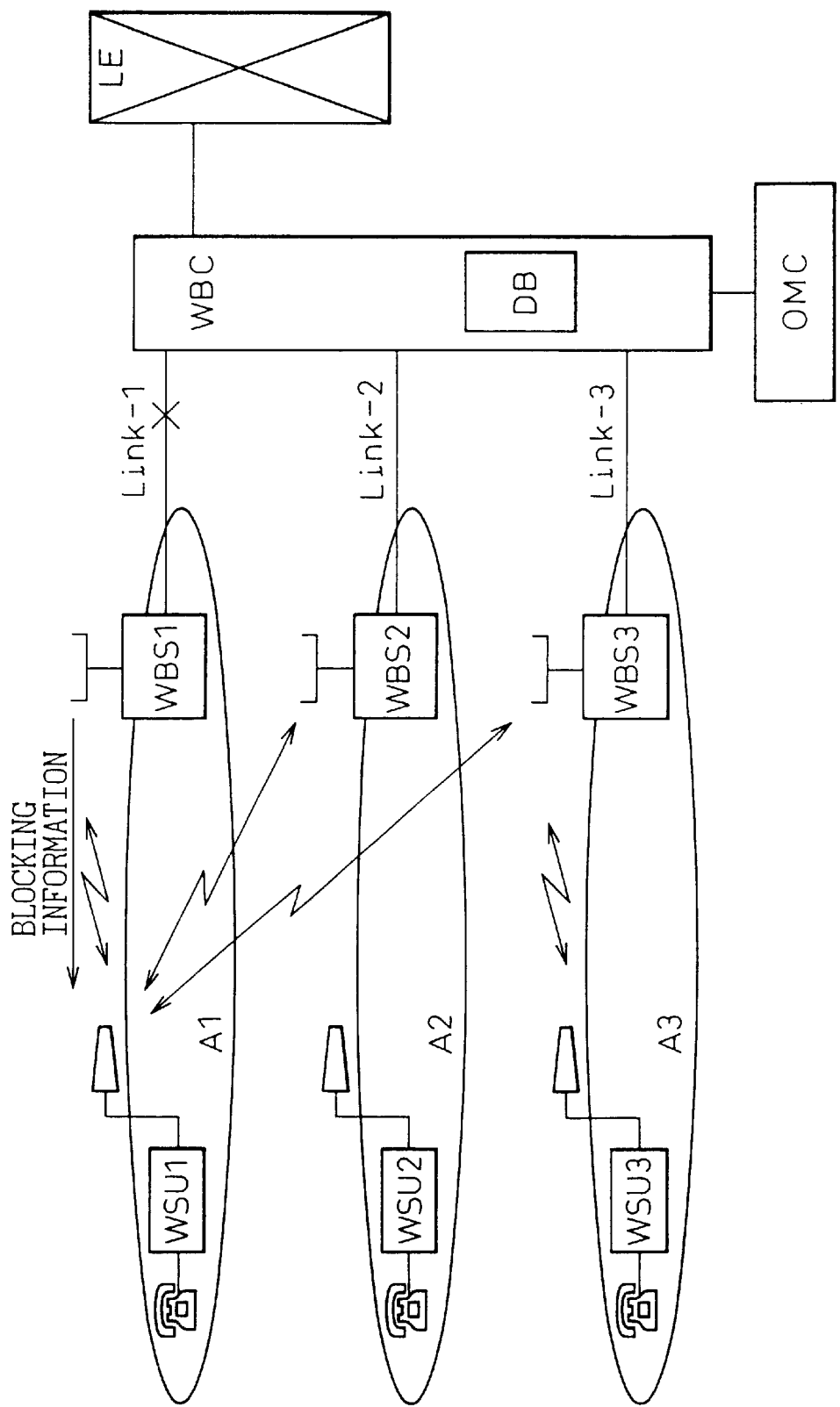
FIG. 1 is an explanatory view of a first embodiment of the present invention.

Turning now to the specific embodiments of the present invention, FIG. 1 is a view explaining a first embodiment of the present invention. In the figure, LE is a line exchange, WBC is a wireless base station controller, OMC is an operation maintenance console, WBS1, WBS2, and WBS3 are wireless base stations, Link-1, Link-2, and Link-3 are links between the wireless base station controller WBC and the wireless base stations, WSU1, WSU2, and WSU3 are wireless subscriber units of the subscribers, A1, A2, and A3 are areas covered by the wireless base stations WBS1, WBS2, and WBS3, and DB is a database.

The wireless base stations WBS1, WBS2, and WBS3 are provided with fault detectors at the wireless base station controller WBC side including the links Link-1, Link-2, and Link-3 and are provided with functions for sending blocking information added to broadcast information when detecting the occurrence of a fault such as a link disconnection by the fault detectors. Further, at the wireless base station controller WBC side, the operation maintenance console OMC maintains and monitors the normality of various parts.

Further, the wireless subscriber units WSU1, WSU2, and WSU3 are provided with functions of receiving and recognizing the broadcast information. When one of them receives and detects blocking information contained in the broadcast information, it determines that a fault has occurred in the wireless base station side working as its stand-by station and receives the broadcast information from the wireless base station of a nearby area. For example, it selects the wireless base station giving the highest reception level and operates with the selected station as the new stand-by station. Due to this, it is possible to switch over so as to enable a wireless link to set up with another wireless base station even though a fault occurs at a wireless base station side from which the reception level does not fall. Note that when the reception level falls or the link is disconnected due to a fault at the wireless base station, in the same way as the related art, since the wireless subscriber unit can determine the occurrence of a fault in the wireless base station, it is possible to switch the setting of the stand-by station to a wireless base station of a nearby area. Further, at the time of call origination or call termination, it is possible to set up a speech channel by a wireless link with that stand-by station.

The database DB in the wireless base station controller WBC stores the status information of the wireless base stations WBS1, WBS2, and WBS3 and the wireless subscriber units WSU1, WSU2, and WSU3 under the wireless base stations WBS1, WBS2, and WBS3. When the wireless base station controller receives a call from the line exchange LE, it refers to the database DB and can select the wireless base station which covers the wireless subscriber unit to which the call should be connected. Note that the wireless base station controller WBC can send, when it receives a call from the line exchange LE, a request for simultaneous calls to call terminating wireless subscriber units to all of the wireless base stations connected to the wireless base station controller WBC. In this case, it is possible to achieve a call termination control even without storing the connections between the wireless base stations and the wireless subscriber units in the database DB.

Figure 2:
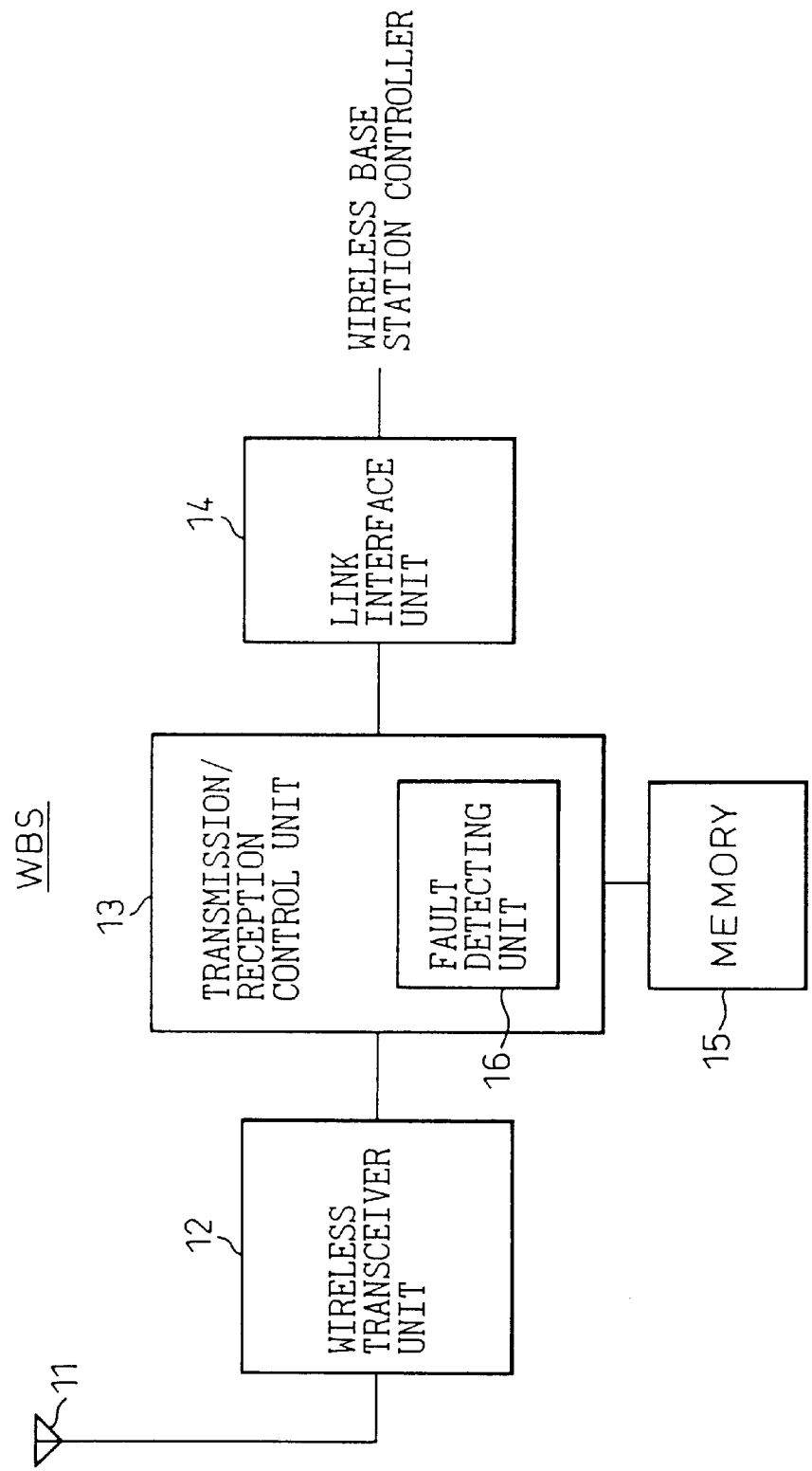
FIG. 2 is an explanatory view of key portions of a wireless base station.

FIG. 2 is a view explaining key portions of a wireless base station. In the figure, reference numeral 11 represents an antenna, 12 a wireless transceiver unit, 13 a transmission/reception control unit, 14 a link interface unit, 15 a memory, and 16 a fault detecting unit. The wireless base station WBS is on the one hand connected through the link interface unit 14 to the wireless base station controller WBC (see FIG. 1) and is on the other hand connected with the wireless subscriber units WSU1, WSU2, and WSU3 through the wireless transceiver unit 12 by a wireless link.

The fault detecting unit 16 detects a fault at the wireless base station controller WBC side connected through the link interface unit 14. The transmission/reception control unit 13 adds blocking information to the broadcast information to be sent on the control channel from the wireless transceiver unit 12 by a detection signal at the time of detection of a disconnection of the link Link-1, Link-2, or Link-3 or other fault. Further, the memory 15 can store identification information, authentication information, etc. of the wireless subscriber unit connected via a wireless link.

For example, if a link disconnection or other fault occurs as shown by the x mark in the link Link-1 of FIG. 1, as explained above, the fault is detected by the fault detecting unit 16 of the wireless base station WBS1 and the blocking information is added to the broadcast information and sent to the wireless subscriber unit WSU1 side under the control of the transmission/reception control unit. That is, the wireless base station WBS1 notifies the wireless subscriber unit WSU1 under the wireless base station WBS1 serving as a stand-by station that the wireless base station WBS1 is not available.

When the wireless subscriber unit WSU1 receives and identifies the blocking information from the wireless base station WBS1 serving as the stand-by station, the unit WSU1 receives and recognizes the broadcast information from the wireless base stations WBS2 and WBS3 covering the areas A2 and A3 nearby the area A1 and switches the setting of the stand-by station to for example the wireless base station WBS2 giving the highest reception level based on the identification information from the same. At this time, if just changing the stand-by wireless base station, when receiving a call from the line exchange LE, a request for calling the wireless subscriber unit WSU1 is sent to all of the wireless base stations connected to the wireless base station controller WBC.

When the wireless subscriber unit WSU1 notifies the wireless base station WBS2 that the unit WSU1 uses the station WBS2 as its stand-by station, the wireless base station WBS2 recognizes that the wireless subscriber unit WSU1 has newly come under it in addition to the wireless subscriber unit WSU2 and adds the related information in the memory 15. Further, it notify the wireless base station controller WBC of the fact to make the database DB updated. In this case, the call termination to the wireless subscriber unit WSU1 can be performed by calling from the wireless base station controller WBC through the wireless base station WBS2 via the control channel.

Figure 3:
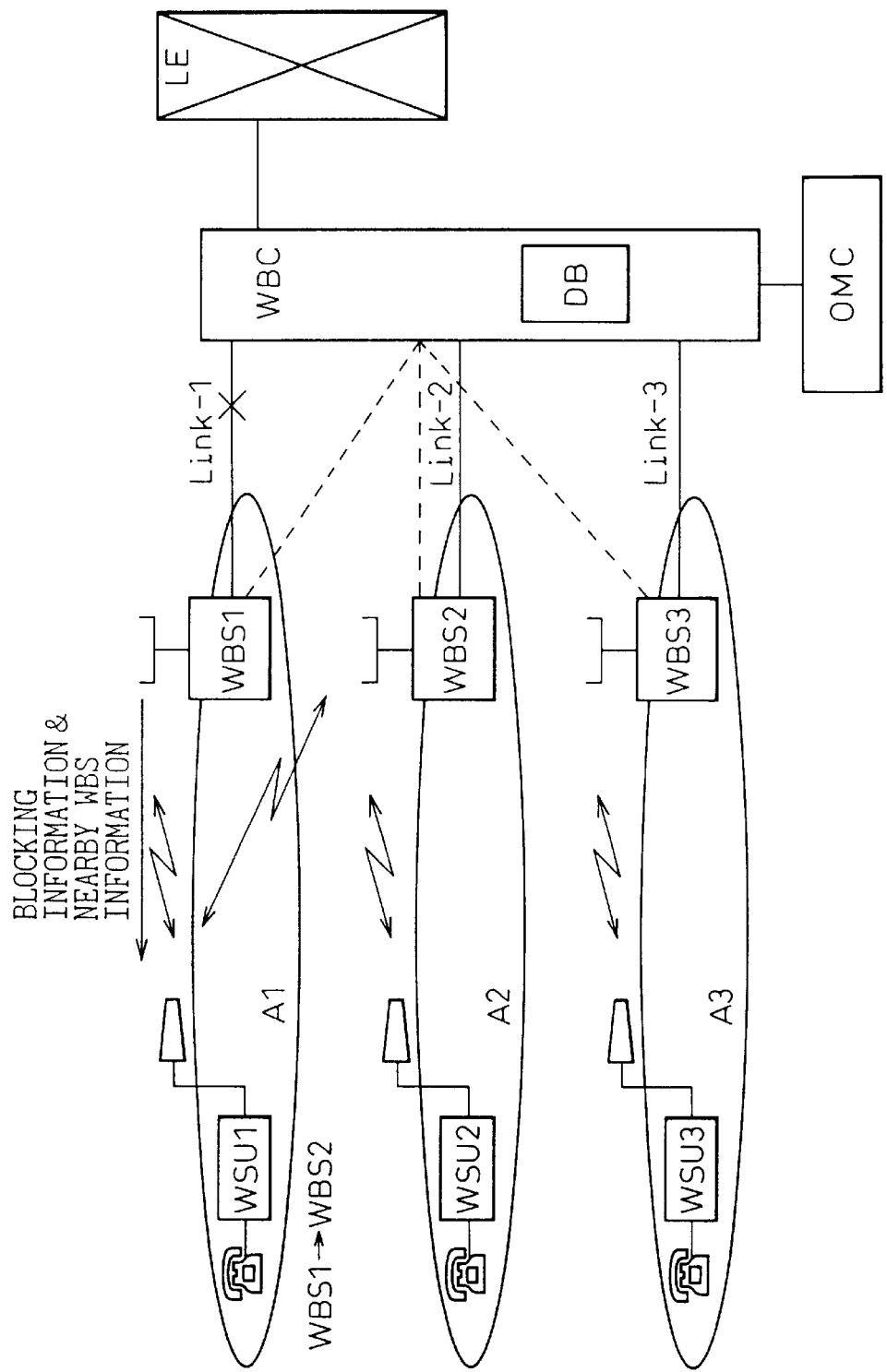
FIG. 3 is an explanatory view of a second embodiment of the present invention.

FIG. 3 is a view explaining a second embodiment of the present invention. In the figure, reference numerals and symbols the same as in FIG. 1 show the same portions. In this embodiment, for example, when there is a link disconnection as shown by the x mark in the link Link-1 or other fault, in the same way as in the case shown in FIG. 1, the wireless base station WBS1 adds blocking information to the broadcast information and also adds the identification information of for example the wireless base station WBS2 in a nearby area thereto as shown by the nearby WBS information.

Due to this, the wireless subscriber unit WSU1 recognizes, by receiving and recognizing the blocking information, that the wireless base station WBS1 which have been available as the stand-by station cannot be used and then switches the setting of the stand-by station to the wireless base station WBS2 in accordance with the nearby WBS information. This nearby WBS information may be set in the memory 15 (see FIG. 2) of the wireless base station at the time of system startup or may be downloaded from the database DB of the wireless base station controller WBC. Further, the nearby WBS information can be read out from the memory 15 and sent together with the blocking information. Further, at the time of system expansion or other change, it is also possible to update the nearby WBS information stored in the memory 15 under the control of the wireless base station controller WBC.

When not storing nearby WBC information in the memory 15 of the wireless base station, it is possible to store that information in the database DB of the wireless base station controller WBC. In this case, by providing the control signal lines shown by the dotted lines in the figure separately from the links Link-1 to Link-3, it is possible to read the nearby WBS information stored in the database DB, transfer it through the control signal lines to the wireless base station, and send the nearby WBS information together with the blocking information when a disconnection of a link Link-1 to Link-3 or other fault occurs.

FIG. 4 is a view explaining the information stored in the database. In the figure, the wireless base stations WBS1, WBS2, and WBS3 . . . , the wireless base station identification information WBS-ID, the existence of fault information (empty, or during a fault), and the nearby WBS information are stored by one to one correspondence in the database. The nearby WBS information is stored as the wireless base station identification information WBS-ID. For example, the nearby WBS information of the wireless base station WBS1 is WBS-ID=02, so the wireless subscriber unit WSU1 switches the setting of the stand-by station from the wireless base station WBS1 to the wireless base station WBS2.

The nearby WBS information of the wireless base station WBS2 is WBS-ID=03. This shows that the wireless base station WBS3 should be selected as the stand-by station. Therefore, when sending blocking information from the wireless base station WBS2 by the detection of a link disconnection or other fault, by sending WBS-ID=03 of the nearby WBS information, the wireless subscriber unit WSU2 switches the setting of the stand-by station to the wireless base station WBS3. Further, the nearby WBS information when stored in the memory 15 of a wireless base station WBS may be just its own nearby WBS information, so for example in the wireless base station WBS2, the nearby WBS information is the wireless base station identification information WBS-ID=03.

Figure 5:
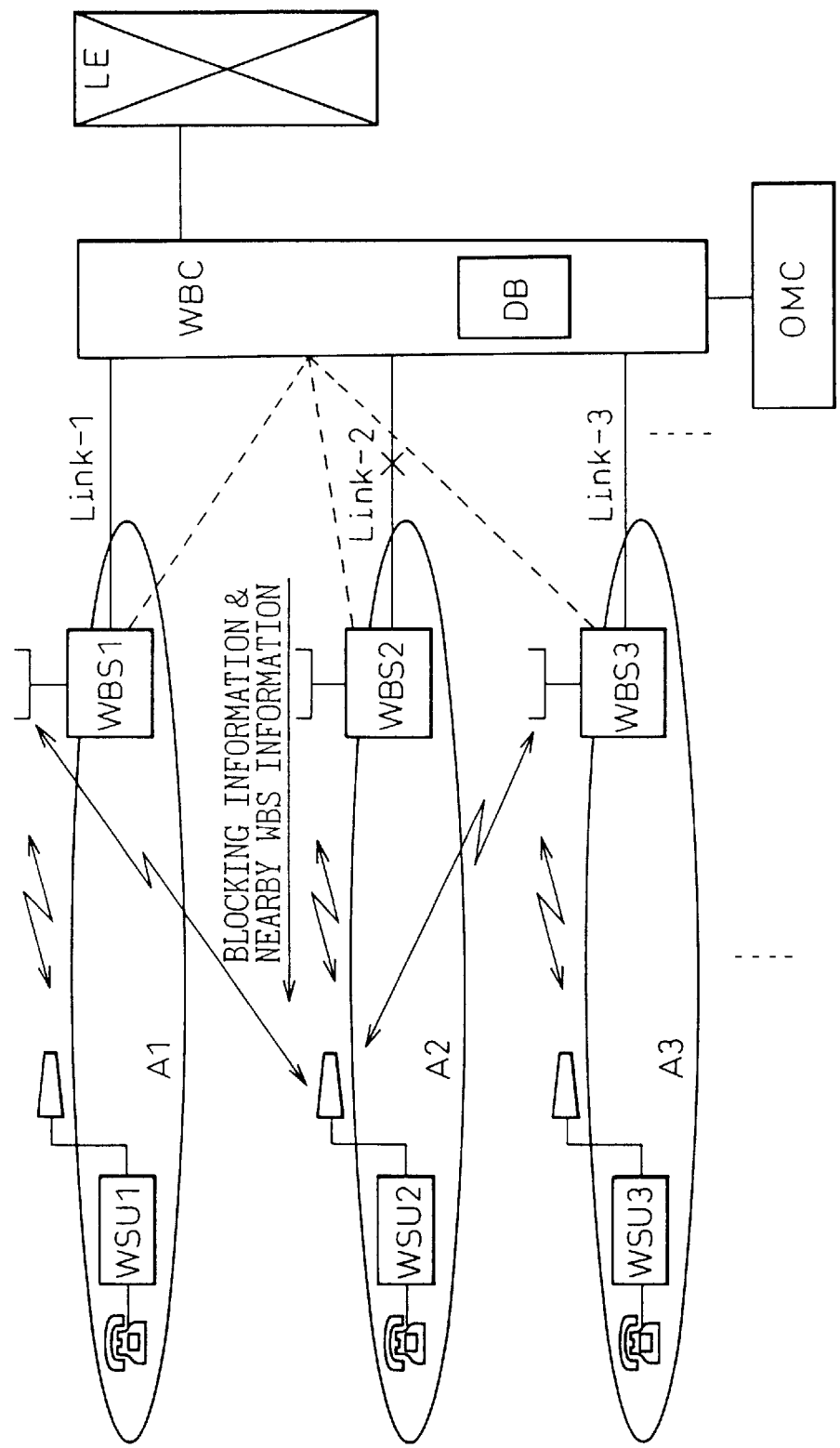
FIG. 5 is an explanatory view of a third embodiment of the present invention.

FIG. 5 is a view explaining a third embodiment of the present invention. In the figure, reference numerals and symbols the same as those in FIG. 1 show the same parts. In the same way as the embodiment shown in FIG. 3, when a fault occurs in a link between a wireless base station WBS and the wireless base station controller WBC, the nearby WBS information is sent from the wireless base station WBS together with the blocking information. In this case, it is possible to send a plurality of nearby WBS information and select one of the nearby WBS information at the wireless subscriber unit according to the reception level.

The database DB of the wireless base station controller WBC in this case stores, for example, the information shown in FIG. 6. That is, while similar to the case shown in FIG. 4, the nearby WBS information stored in the database is the single WBS-ID=02 for the wireless base station WBS1, the multiple WBS-ID=01 and 03 for the wireless base station WBS2, and the multiple WBS-ID=02 and 04 for the wireless base station WBS3. Note that the illustration of the part of the configuration relating to WBS-ID=04 is omitted. Further, it is also possible to store therein a larger amount of nearby WBS information than that illustrated in FIG. 6.

Therefore, when a link disconnection or other fault occurs at the point shown by the x mark on the link Link-2 in FIG. 5, the wireless base station WBS2 adds the blocking information and nearby WBS information to the broadcast information and sends the same. In this case as well, when a control signal lines are provided as shown by the broken lines in the figure, the nearby WBS information from the database DB is sent to the wireless base station WBS2 through the control signal line, whereby it is possible to send WBS-ID=01 and 03 as the nearby WBS information. Further, when storing nearby WBS information in the memory 15 of a wireless base station WBS (see FIG. 2), it is possible to send the nearby WBS information together with the blocking information without using the above control signal lines.

If for example the wireless subscriber unit WSU2 receives and detects a plurality of nearby WBS information WBS-ID=01 and 03 from the wireless base station WBS2 together with the blocking information, the unit WSU2 compares the reception levels of the wireless base station WBS1 and WBS3 and sets for example the wireless base station WBS3 as the stand-by station when the reception level of the wireless base station WBS3 is higher. In this case as well, the wireless subscriber unit WSU2 notifies the wireless base station WBS3 that the unit WSU2 uses the station WBS3 as the stand-by station. Based on this, the data in the memory 15 of the wireless base station WBS3 (see FIG. 2) or the data of the database DB of the wireless base station controller WBC is updated and thus the wireless subscriber unit WSU2 can be called up when a call is received through the line exchange LE.

Figure 7:
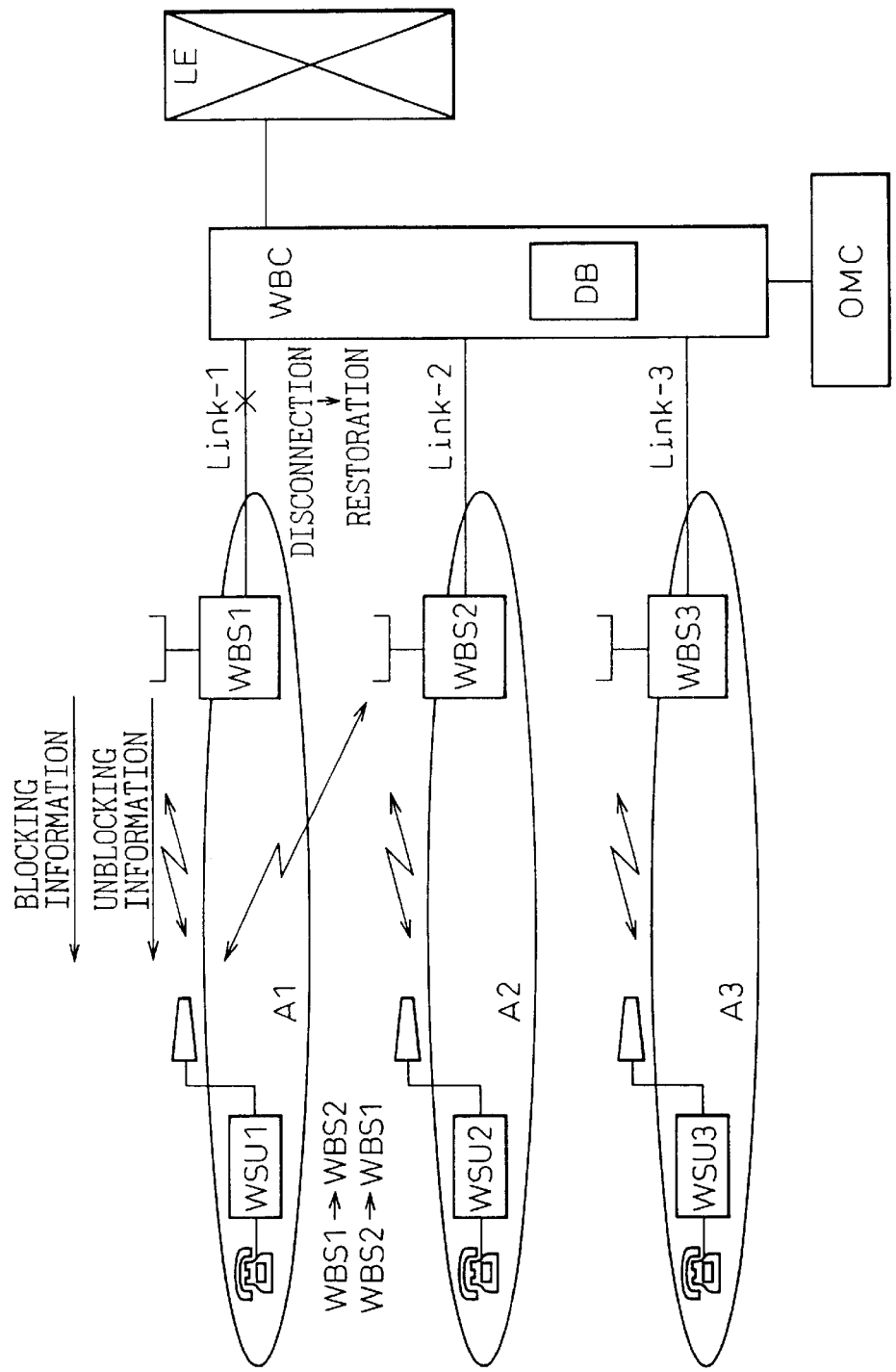
FIG. 7 is an explanatory view of a fourth embodiment of the present invention.

FIG. 7 is a view explaining a fourth embodiment of the present invention. In the figure, reference numerals and symbols the same as in FIG. 1 show the same parts. This embodiment shows the processing when recovering from a link disconnection shown by the x mark on the link Link-1 for example. When the system is started up or when the power is turned on, the wireless subscriber units WSU1, WSU2, and WSU3 store the identification information of the initial wireless base stations WBS1, WBS2, and WBS3 to be connected therewith.

Further, when a link disconnection of the link Link-1 or other fault occurs, the wireless base station WBS1 sends blocking information. The wireless subscriber unit WSU1 determines that the wireless base station WBS1 can no longer be used by receiving that blocking information and recognizing the same, and then it switches the setting of the stand-by station to the wireless base station of the nearby area in accordance with the above embodiments. In this case, for example, the wireless base station WBS2 is made the stand-by station as shown by WBS1→WBS2 in the figure. The wireless subscriber unit WSU1 monitors the stored broadcast information from the original wireless base station WBS1 at predetermined intervals.

When recovering from a link disconnection of the link Link-1 or other fault, the wireless base station WBS1 can start communicating with the wireless base station controller WBC, so the wireless base station WBS1 sends the unblocking information. The blocking information, as mentioned above, is sent using a part of the field of the broadcast information. For example, the field can be used for a fault flag etc. where it is possible to express that the blocking information is sent when the flag is set and the unblocking information is sent when the flag is not set. That is, it is possible to provide notification that there is a fault or is not a fault selectively.

The wireless subscriber unit WSU1 sets the wireless base station WBS2 as the stand-by station, but as mentioned above, receives broadcast information from the wireless base station WBS1 at predetermined intervals. Thus, when receiving the broadcast information and identifying the fact that unblocking information has been added to the broadcast information, as shown by WBS2→WBS1, the wireless base station WBS1 which becomes unblocked is switched to the stand-by station. That is, the wireless subscriber unit WSU1 covered by the wireless base station WBS1 can return to its initial state.

Figure 8:
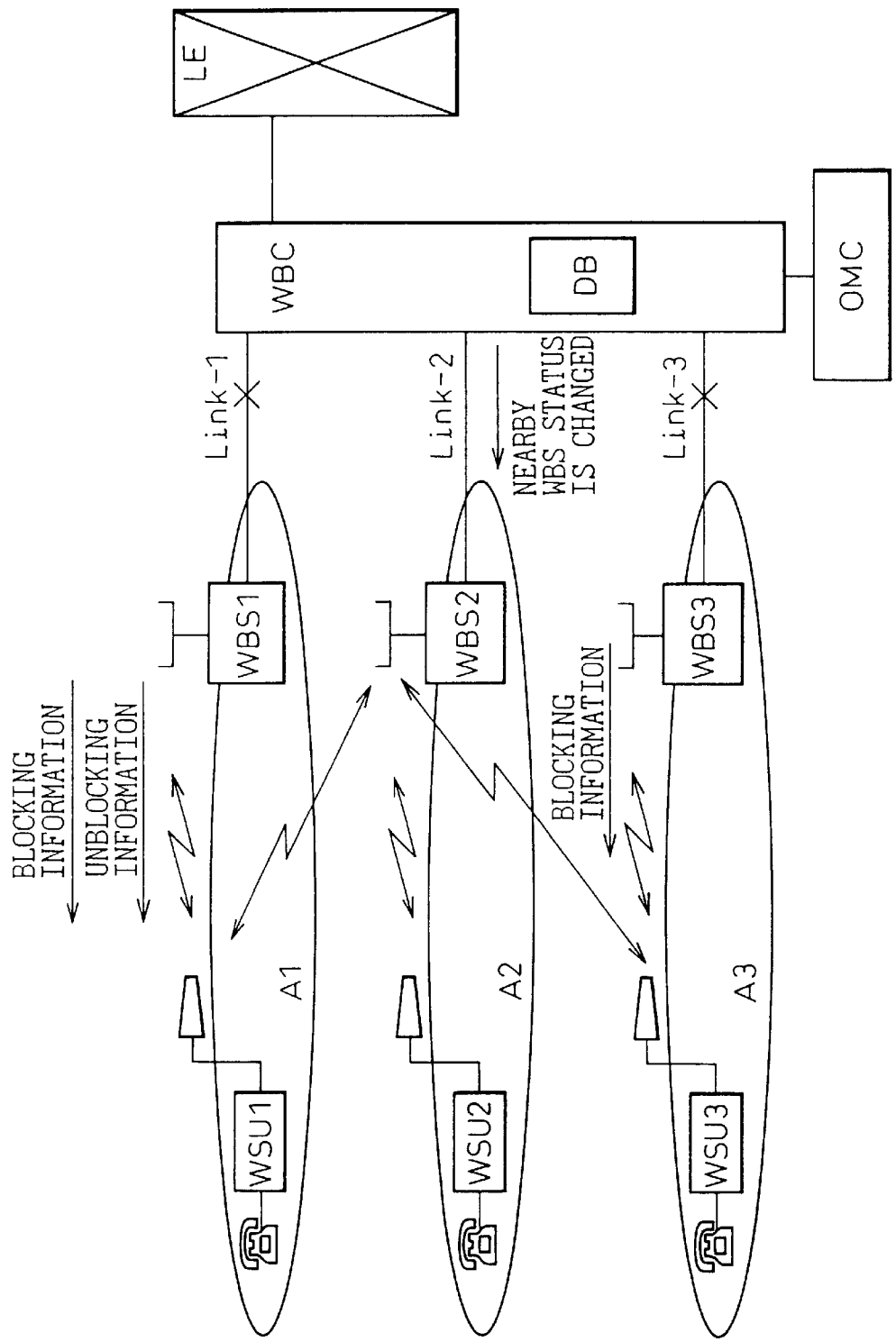
FIG. 8 is an explanatory view of a fifth embodiment of the present invention.
Figure 9:
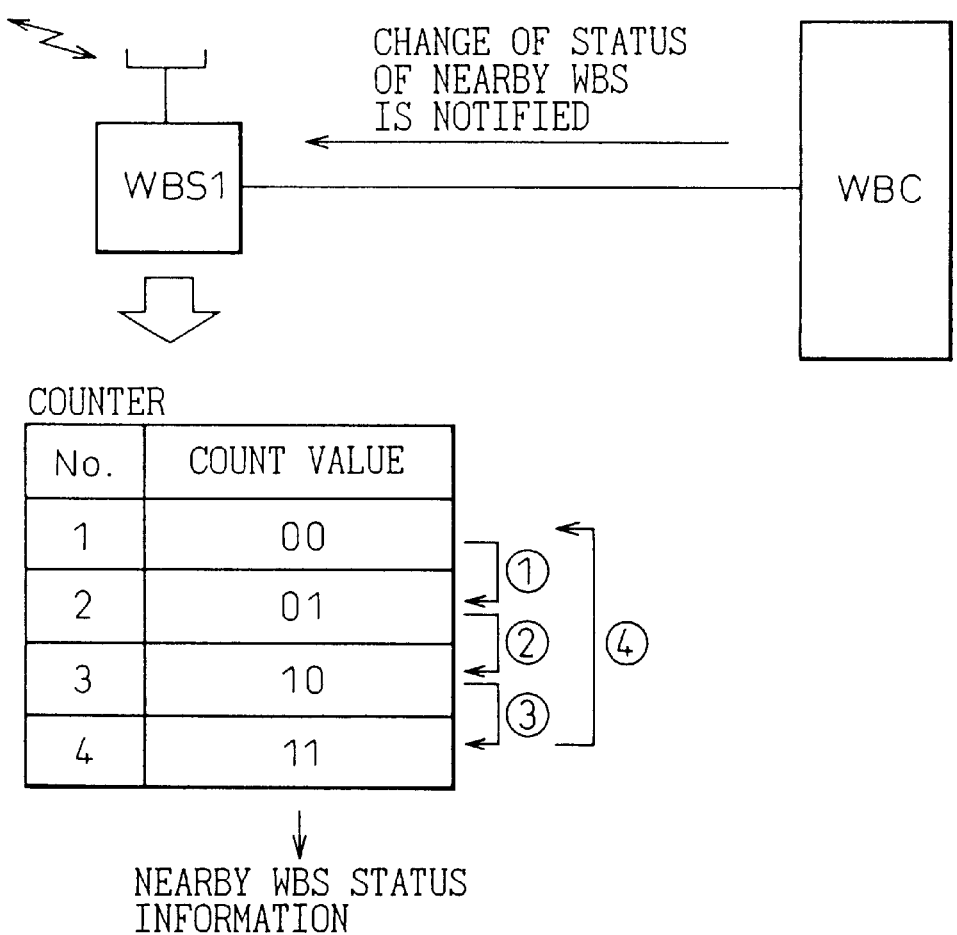
FIG. 9 is an explanatory view of counter control in the fifth embodiment of the present invention.

FIG. 8 is a view explaining a fifth embodiment of the present invention. In the figure, reference numerals and symbols the same as those in FIG. 1 show the same parts. The wireless base stations WBS1, WBS2, and WBS3 are provided with respective nearby WBS status information counters. Each counter, as shown in FIG. 9, is incremented every time a change in the nearby WBS state is notified from the wireless base station controller WBC. As illustrated, the case is shown of the count value changing as shown by "00"→"01"→"10"→"11". The count value is sent to the stand-by wireless subscriber unit as the nearby WBS status information in the broadcast information.

The wireless subscriber units WSU1, WSU2, and WSU3 store the identification information (ID'S) of the wireless base stations WBS1, WBS2, and WBS3 respectively which are originally serving as the stand-by stations when the power is turned on. Further, for example, when there are link disconnections as shown by each x mark in the links Link-1 and Link-3, the wireless base stations WBS1 and WBS3 send blocking information added to the broadcast information. Further, the wireless base station controller WBC detects and recognizes the faults occurring between the controller WBC and the wireless base stations WBC1 and WBC3 and then stores the fault information in the database DB.

The wireless subscriber units WSU1 and WSU3 receiving and recognizing the blocking information switch the setting of the stand-by stations to for example the wireless base station WBS2 of the nearby area A2.

At this time, the wireless base station WBS2 notifies the wireless subscriber units of the count value of its counter as the nearby WBS status information which is added to the broadcast information. The wireless subscriber units WSU1 and WSU3 using the wireless base station WBS2 as a stand-by station hold the count value. The wireless subscriber units WSU1 and WSU3 in this case continue to use only the wireless base station WBS2 as the stand-by station.

When for example, the link Link-1 is restored, the wireless base station controller WBC can recognize by the operation maintenance console OMC etc. that communication with the wireless base station WBS1 which had been in a fault state has recovered, so the normal wireless base station WBS2 is notified of the change of the nearby WBS status. Due to this, the wireless base station WBS2, as shown in FIG. 9, increments the counter. For example, if the initial count value is "00", the count value is held by the wireless subscriber units WSU1 and WSU3 as well. Due to the increment of the counter, "00" becomes "01". This count value is sent as the nearby WBS status information.

The wireless subscriber units WSU1 and WSU3 receive and recognize the nearby WBS status information and then compare the nearby WBS status information with the nearby WBS status information has been held after the switching of the stand-by wireless base station. In this case, when a change in the nearby WBS status information, that is, the count value of the counter, from "00" to "01" is detected, the stand-by wireless base station is switched to return to the original state in accordance with the wireless base station identification information (ID) held at the time of the power startup. At this time, the blocking information is no longer sent to the wireless subscriber unit WSU1 since the wireless base station WBS1 has recovered, so the unit WSU1 switches the setting so that the wireless base station WBS1 is returned to its original state to make it the stand-by station.

At this time, the wireless subscriber unit WSU3 tries to switch the stand-by station to the original wireless base station WBS3, but continues to be sent the blocking information from the wireless base station WBS3, so the wireless subscriber unit WSU3 again uses the wireless base station WBS2 as the stand-by station and holds the nearby WBS status information at that time, that is, the count value "01". Further, the wireless subscriber unit WSU3 switches the setting of the stand-by station to the original wireless base station WBS3 again when the count value changes to "10" and then determines if the blocking information is continuing to be sent. When the blocking information is not being sent, the wireless base station WBS3 is made the stand-by station. When the blocking information is continuing to be sent, the wireless base station WBS2 is again made the stand-by station.

Figure 10:
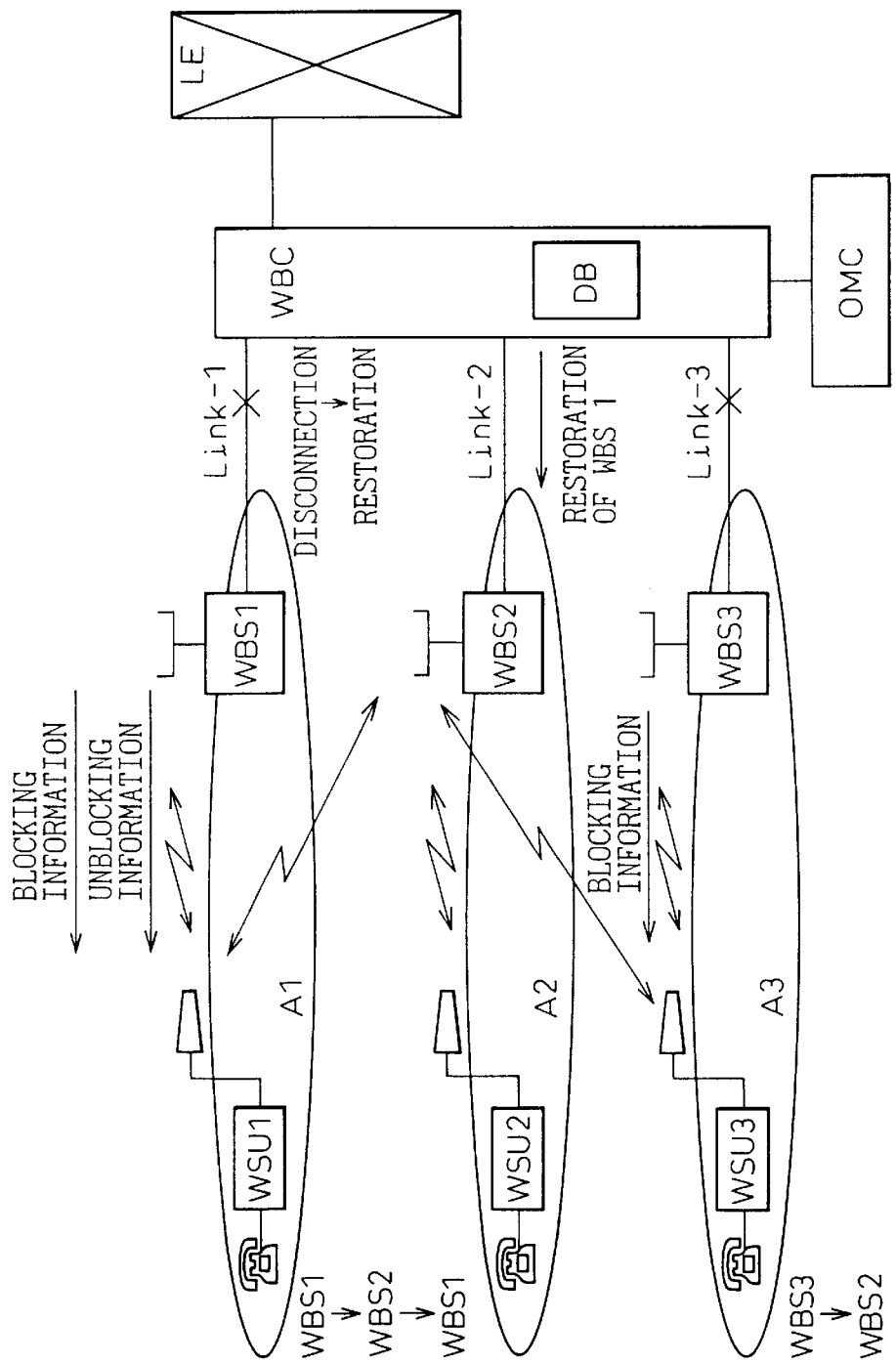
FIG. 10 is an explanatory view of a sixth embodiment of the present invention.

FIG. 10 is a view explaining a sixth embodiment of the present invention. In the figure, reference numerals or symbols the same as in FIG. 1 show the same parts. In the same way as the embodiment shown in FIG. 8, the wireless subscriber units WSU1, WSU2, and WSU3 store the identification information (ID'S) of the wireless base stations WBS1, WBS2, and WBS3 serving as stand-by stations respectively when the power is turned on.

When disconnections as shown by the x mark in for example the links Link-1 and Link-3 or other faults occur, the wireless base stations WBS1 and WBS3 add blocking information to respective broadcast information and send the same. When the wireless base station controller WBC detects and recognizes the faults occurring between the controller WBC and the wireless base stations WBS1 and WBS3, the controller WBC stores the fault information in the database DB. Further, when the wireless subscriber units WSU1 and WSU3 receive and recognize the blocking information, they switch the setting of the stand-by stations to the wireless base station WBS2 in the nearby area A2.

When the link Link-1 is restored, the wireless base station controller WBC recognizes that the fault occurring between WBC and the wireless base station WBS1 has been recovered, the wireless base station controller WBC refers to the database DB therein, notifies the normal wireless base station WBS2 of the recovery of the wireless base station WBS1, and updates the database DB. The wireless base station WBS2 sends the recovery of the wireless base station WBS1 as the nearby WBS status information to be added to the broadcast information.

Due to this, the wireless subscriber unit WSU1 recognizes the recovery of the wireless base station WBS1 and switches the stand-by station from the wireless base station WBS2 to the wireless base station WBS1. Therefore, the wireless subscriber unit WSU1 in this case switches stand-by stations as illustrated by WBS1→WBS2→WBS1. At this time, the wireless subscriber unit WSU3 is not notified of the recovery of the wireless base station WBS3, so continues using the wireless base station WBS2 as its stand-by station.

Further, when blocking information is sent from the wireless base stations WBS1, WBS2, and WBS3, all of the wireless subscriber units under one of the wireless base stations switch the setting to be covered by the wireless base station of a nearby area. At this time, the capacity of the related wireless base station sometimes is exceeded. In this case, the wireless base station WBS or the wireless base station controller WBC individually specifies the wireless subscriber units exceeding that capacity and issue a request for change of the stand-by station so that they come under the specified wireless base stations.

Further, at the time of testing or construction of a wireless base station, it is possible to add blocking information to the broadcast information and send the same automatically or by manual setting. Therefore, smooth control becomes possible at the time of system expansion.

Summarizing the effects of the invention, as explained above, in the present invention, even when normal wireless transmission and reception are maintained by wireless base station WBS1, WBS2, and WBS3, if there is a link disconnection or other fault disabling communication between any of the base stations and higher rank equipment, blocking information is added to broadcast information and sent so as to notify, to the wireless subscriber units under that wireless base station, that it cannot be used as a stand-by station and therefore it is made possible to switch the setting of the stand-by station to a normal wireless base station of a nearby area, so that communications are made possible by setting a wireless channel with a newly set stand-by station.

Further, when the wireless base station recovers from the fault, the wireless base station sends the unblocking information to the wireless subscriber units. By this the wireless subscriber units receiving and recognizing the unblocking information can switch the setting to the original stand-by station. Therefore, when the fault is recovered, there is the advantage that the original state of communication can be automatically restored.

While the invention has been described with reference to specific embodiment chosen for purpose of illustration, it should be apparent that numerous modifications could be made thereto by those skilled in the art without departing from the basic concept and scope of the invention.

What is claimed is:

1. A WLL system comprising a plurality of wireless base stations connected to a wireless base station controller and a plurality of wireless subscriber units connected to these wireless base stations through wireless links, wherein:
   the wireless base stations are provided with detecting means for detecting a fault between them and the wireless base station controller and means for setting blocking information in broadcast information and notifying the fault to the wireless subscriber units when the detecting means detects a fault and
   the wireless subscriber units are provided with first switching means for switching the setting of a stand-by station to the wireless base station of a nearby area when receiving the blocking information.

2. A WLL system as set forth in claim 1, wherein the wireless base stations are provided with first nearby base station information notifying means for adding blocking information and identification information of the wireless base station of a nearby area to the broadcast information and sending the same to switch the setting of the stand-by station when the detecting means detect the fault.

3. A WLL system as set forth in claim 2, wherein:
   each of the wireless base stations is provided with a counter incremented in accordance with a notification of a change of a nearby wireless base station status sent from the wireless base station controller due to recovery from the fault and a count sending means for adding the count value of the counter to the broadcast information as nearby wireless base station status information and sending the same and
   each of the wireless subscriber units is provided with a fourth means for detecting a change in the nearby wireless base station status information, recognizing the recovery of the wireless base station from the fault, and switching the setting of the stand-by station to the original wireless base station.

4. A WLL system as set forth in claim 1, wherein:
   the wireless base stations are provided with second nearby base station information notifying means for adding blocking information and identification information of a plurality of wireless base stations of nearby areas serving as the stand-by stations to the broadcast information and sending the same when the detecting means detect the fault and
   the wireless subscriber units are provided with second means for comparing the reception levels from the plurality of wireless base stations of the nearby areas and switching the setting of the stand-by station to the wireless base station giving the highest reception level.

5. A WLL system as set forth in claim 4, wherein:
   each of the wireless base stations is provided with an unblocking information notifying means for adding unblocking information to the broadcast information and sending the same when the detecting means detects a fault and then detects recovery from the fault and
   each of the wireless subscriber units is provided with a third switching means for switching the setting of the stand-by station to the original wireless base station when receiving and recognizing the unblocking information.

6. A WLL system as set forth in claim 4, wherein:
   each of the wireless base stations is provided with a counter incremented in accordance with a notification of a change of a nearby wireless base station status sent from the wireless base station controller due to recovery from the fault and a count sending means for adding the count value of the counter to the broadcast information as nearby wireless base station status information and sending the same and
   each of the wireless subscriber units is provided with a fourth means for detecting a change in the nearby wireless base station status information, recognizing the recovery of the wireless base station from the fault, and switching the setting of the stand-by station to the original wireless base station.

7. A WLL system as set forth in claim 1, wherein:
   each of the wireless base stations is provided with an unblocking information notifying means for adding unblocking information to the broadcast information and sending the same when the detecting means detects a fault and then detects recovery from the fault and
   each of the wireless subscriber units is provided with a third switching means for switching the setting of the stand-by station to the original wireless base station when receiving and recognizing the unblocking information.

8. A WLL system as set forth in claim 2, wherein:
   each of the wireless base stations is provided with an unblocking information notifying means for adding unblocking information to the broadcast information and sending the same when the detecting means detects a fault and then detects recovery from the fault and
   each of the wireless subscriber units is provided with a third switching means for switching the setting of the stand-by station to the original wireless base station when receiving and recognizing the unblocking information.

9. A WLL system as set forth in claim 1, wherein:
   each of the wireless base stations is provided with a counter incremented in accordance with a notification of a change of a nearby wireless base station status sent from the wireless base station controller due to recovery from the fault and a count sending means for adding the count value of the counter to the broadcast information as nearby wireless base station status information and sending the same and each of the wireless subscriber units is provided with a fourth means for detecting a change in the nearby wireless base station status information, recognizing the recovery of the wireless base station from the fault, and switching the setting of the stand-by station to the original wireless base station.

10. A method for wireless link control in a WLL system comprising a plurality of wireless base stations connected to the wireless base station controller WBC and a plurality of wireless subscriber units connected to these wireless base stations through wireless links, comprising:

a step of adding blocking information to the broadcast information, when a fault occurring between the wireless base station controller WBC and a wireless base station WBS1, WBS2, or WBS3 is detected, and sending the same, and a step of receiving and recognizing the sent block information at the wireless subscriber unit having the wireless base station as a stand-by station and further switching the setting of the stand-by station to a wireless base station of a nearby area not sending a blocking information.

11. A method for wireless link control as set forth in claim 10, further comprising:

a step of adding, when a wireless base station WBS1, WBS2, or WBS3 detects a fault, identification information of a wireless base station of a nearby area to be served as a stand-by station for the wireless subscriber unit which has used the wireless base station as a stand-by station before the fault, as well as the blocking information, to the broadcast information and sending the same and a step of switching, at the wireless subscriber unit receiving the sent broadcast information, the setting of the stand-by station to the wireless base station of the nearby area based on the identification information of that wireless base station.

12. A method for wireless link control as set forth in claim 11, further comprising:

a step of adding, when a wireless base station WBS1, WBS2, or WBS3 detects a fault, blocking information to broadcast information and sending the same, a step of adding, when detecting recovery from the fault, unblocking information to the broadcast information and sending the same, a step of storing, at each of the wireless subscriber unit, identification information of the wireless base station originally used as the stand-by station, a step of continuing, after receiving and recognizing the blocking information and then changing the wireless base station of the nearby area to a stand-by station, receiving the broadcast information from the wireless base station of the nearby area originally used as the stand-by station at predetermined intervals, and a step of receiving and recognizing the unblocking information and then switching the setting of the stand-by station to the original wireless base station based on the stored identification information of the wireless base station.

13. A method for wireless link control as set forth in claim 11, further comprising:

a step of sending, from the wireless base station controller WBC, a notification of a change of a nearby base station status to a normal wireless base station other than the wireless base station recovering, after detection of an occurrence of a fault, from the fault, a step of adding, by providing, at each of the wireless base stations WBS1, WBS2, or WBS3, a counter incremented at every notification of a change of a nearby base station, a count value of the counter as nearby base station status information to the broadcast information and sending the same, a step of adding, when detecting the fault, blocking information to the broadcast information and sending the same, a step of adding, when detecting recovery from the fault, unblocking information to the broadcast information and sending the same, a step of storing, at each of the wireless subscriber units WSU1, WSU2 and WSU3, identification information of the wireless base station originally used as the stand-by station, a step of switching, when receiving and recognizing the block information, the setting of the stand-by station to a wireless base station of a nearby area, a step of holding the count value as the nearby base station status information of that wireless base station, a step of comparing and detecting the change in the count value at the time of the recovery from the fault, a step of receiving the broadcast information from the stored original wireless base station, and a step of restoring, when the unblocking information is included, the wireless radio station as a stand-by station.

14. A method for wireless link control as set forth in claim 10, further comprising:

a step of adding, when a wireless base station WBS1, WBS2, or WBS3 detects a fault, an identification information of a plurality of the wireless base stations of nearby areas to the broadcast information, as well as the blocking information and sending the same, a step of measuring, at each of the wireless subscriber unit receiving the sent broadcast information, the reception levels from the plurality of wireless base stations of nearby areas and a step of switching the setting of the stand-by station to the wireless base station giving the maximum reception level.

15. A method for wireless link control as set forth in claim 14, further comprising:

a step of adding, when a wireless base station WBS1, WBS2, or WBS3 detects a fault, blocking information to broadcast information and sending the same, a step of adding, when detecting recovery from the fault, unblocking information to the broadcast information and sending the same, a step of storing, at each of the wireless subscriber unit, identification information of the wireless base station originally used as the stand-by station, a step of continuing, after receiving and recognizing the blocking information and then changing the wireless base station of the nearby area to a stand-by station, receiving the broadcast information from the wireless base station of the nearby area originally used as the stand-by station at predetermined intervals, and a step of receiving and recognizing the unblocking information and then switching the setting of the stand-by station to the original wireless base station based on the stored identification information of the wireless base station.

16. A method for wireless link control as set forth in claim 14, further comprising:

a step of sending, from the wireless base station controller WBC, a notification of a change of a nearby base station status to a normal wireless base station other than the wireless base station recovering, after detection of an occurrence of a fault, from the fault, a step of adding, by providing, at each of the wireless base stations WBS1, WBS2, or WBS3, a counter incremented at every notification of a change of a nearby base station, a count value of the counter as nearby base station status information to the broadcast information and sending the same, a step of adding, when detecting the fault, blocking information to the broadcast information and sending the same, a step of adding, when detecting recovery from the fault, unblocking information to the broadcast information and sending the same, a step of storing, at each of the wireless subscriber units WSU1, WSU2 and WSU3, identification information of the wireless base station originally used as the stand-by station, a step of switching, when receiving and recognizing the block information, the setting of the stand-by station to a wireless base station of a nearby area, a step of holding the count value as the nearby base station status information of that wireless base station, a step of comparing and detecting the change in the count value at the time of the recovery from the fault, a step of receiving the broadcast information from the stored original wireless base station, and a step of restoring, when the unblocking information is included, the wireless radio station as a stand-by station.

17. A method for wireless link control as set forth in claim 10, further comprising:

a step of adding, when a wireless base station WBS1, WBS2, or WBS3 detects a fault, blocking information to broadcast information and sending the same, a step of adding, when detecting recovery from the fault, unblocking information to the broadcast information and sending the same, a step of storing, at each of the wireless subscriber unit, identification information of the wireless base station originally used as the stand-by station, a step of continuing, after receiving and recognizing the blocking information and then changing the wireless base station of the nearby area to a stand-by station, receiving the broadcast information from the wireless base station of the nearby area originally used as the stand-by station at predetermined intervals, and a step of receiving and recognizing the unblocking information and then switching the setting of the stand-by station to the original wireless base station based on the stored identification information of the wireless base station.

18. A method for wireless link control as set forth in claim 10, further comprising:

a step of sending, from the wireless base station controller WBC, a notification of a change of a nearby base station status to a normal wireless base station other than the wireless base station recovering, after detection of an occurrence of a fault, from the fault, a step of adding, by providing, at each of the wireless base stations WBS1, WBS2, or WBS3, a counter incremented at every notification of a change of a nearby base station, a count value of the counter as nearby base station status information to the broadcast information and sending the same, a step of adding, when detecting the fault, blocking information to the broadcast information and sending the same, a step of adding, when detecting recovery from the fault, unblocking information to the broadcast information and sending the same, a step of storing, at each of the wireless subscriber units WSU1, WSU2 and WSU3, identification information of the wireless base station originally used as the stand-by station, a step of switching, when receiving and recognizing the block information, the setting of the stand-by station to a wireless base station of a nearby area, a step of holding the count value as the nearby base station status information of that wireless base station, a step of comparing and detecting the change in the count value at the time of the recovery from the fault, a step of receiving the broadcast information from the stored original wireless base station, and a step of restoring, when the unblocking information is included, the wireless radio station as a stand-by station.

\* \* \* \* \*